United States Patent [19]

Walton

[11] 4,142,674

[45] Mar. 6, 1979

[54] RECOGNITION AND IDENTIFICATION KEY HAVING ADAPTABLE RESONANT FREQUENCY AND METHODS OF ADAPTING SAME

[75] Inventor: Charles A. Walton, Los Gatos, Calif.

[73] Assignee: Schlage Electronics, Inc., Sunnyvale, Calif.

[21] Appl. No.: 760,115

[22] Filed: Jan. 17, 1977

[51] Int. Cl.² .......................... G07F 1/06; G06K 7/00
[52] U.S. Cl. ...................................... 235/492; 70/277; 235/487
[58] Field of Search .................... 235/61.6 C, 61.11 A, 235/61.11 H, 61.12 R, 61.12 C, 492, 488, 487; 70/277, 278

[56] References Cited

U.S. PATENT DOCUMENTS

| 3,134,254 | 5/1964 | Richard | 235/61.11 H |
| 3,397,393 | 8/1968 | Palmateer et al. | 235/61.11 H |
| 3,530,281 | 9/1970 | Smeiman | 235/61.11 H |
| 3,702,464 | 11/1972 | Castrucci | 235/61.11 H |

Primary Examiner—Vincent P. Canney
Attorney, Agent, or Firm—Schatzel & Hamrick

[57] ABSTRACT

A recognition and identification key comprising a substrate formed from an electrically insulating material, a first sheet of conductive material formed on a first surface of the substrate in a looping pattern so as to provide an inductive element, and a capacitive element coupled to the first sheet such that the elements are resonant at a first frequency, at least one of the inductive and capacitive elements capable of being changed such that the key is resonant at a second frequency, and a method of adapting the resonant frequency.

22 Claims, 8 Drawing Figures

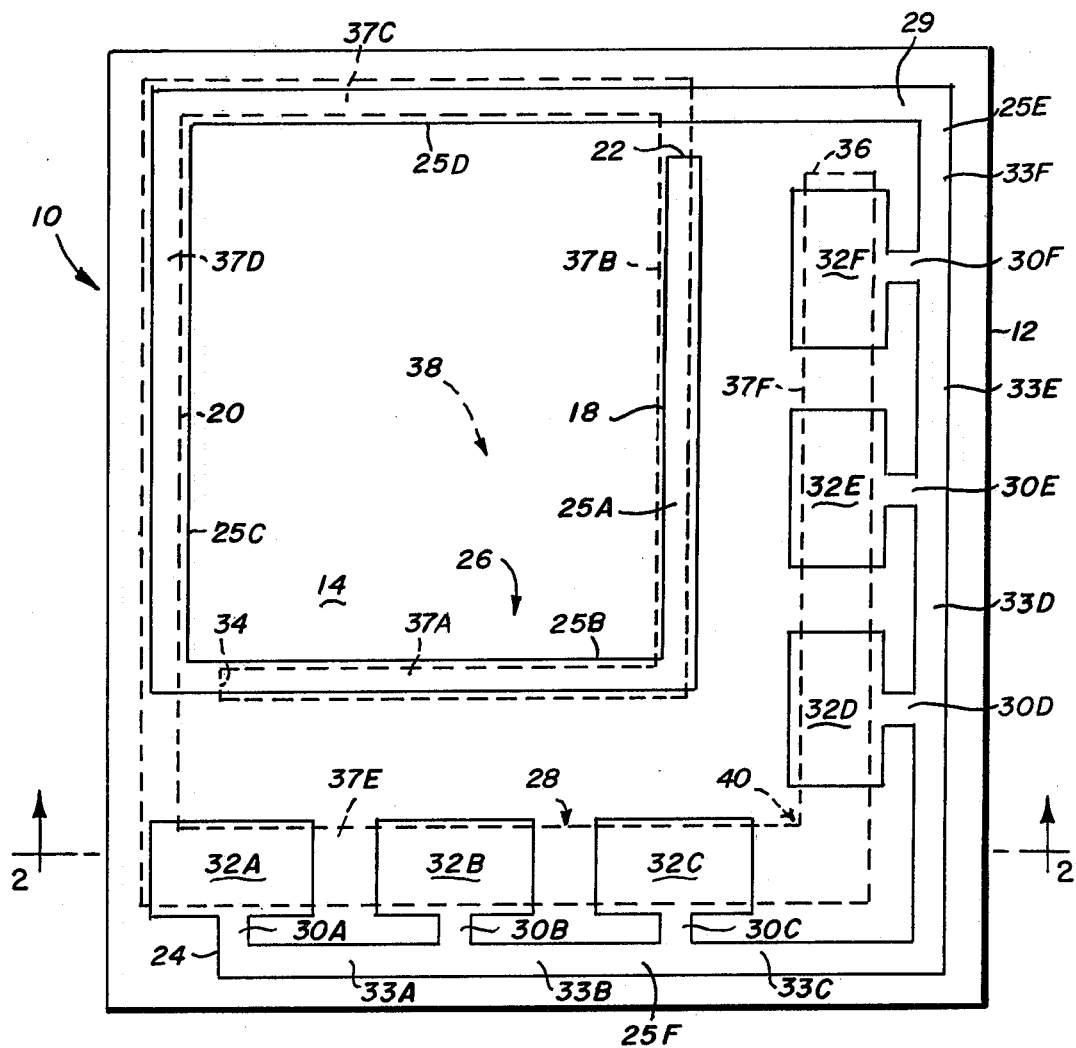
Fig_1
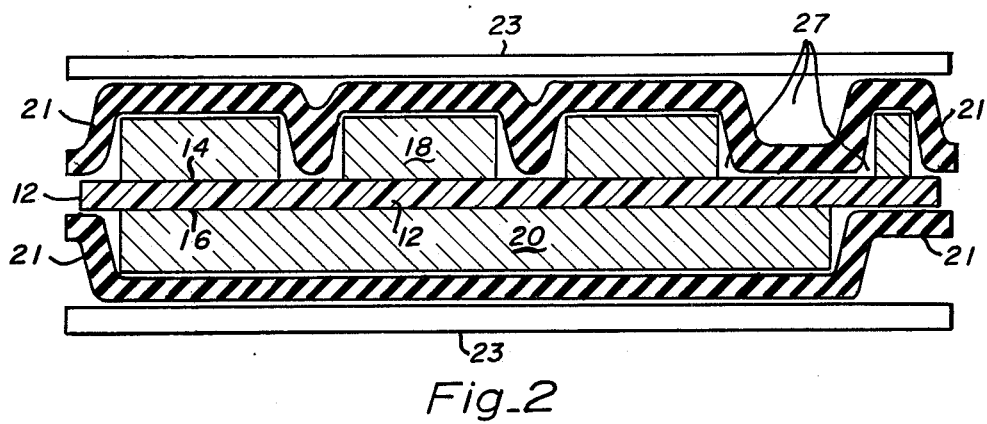
Fig_2

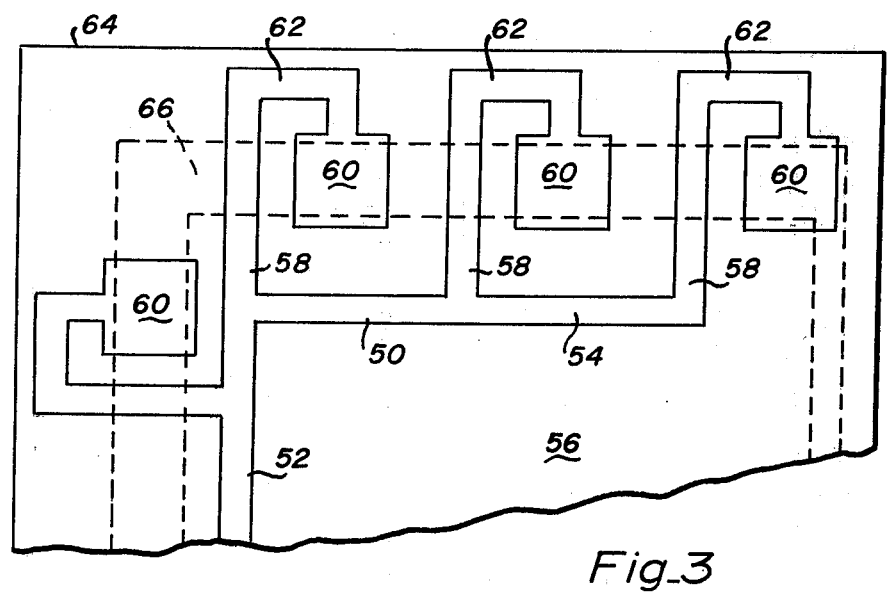
Fig_3
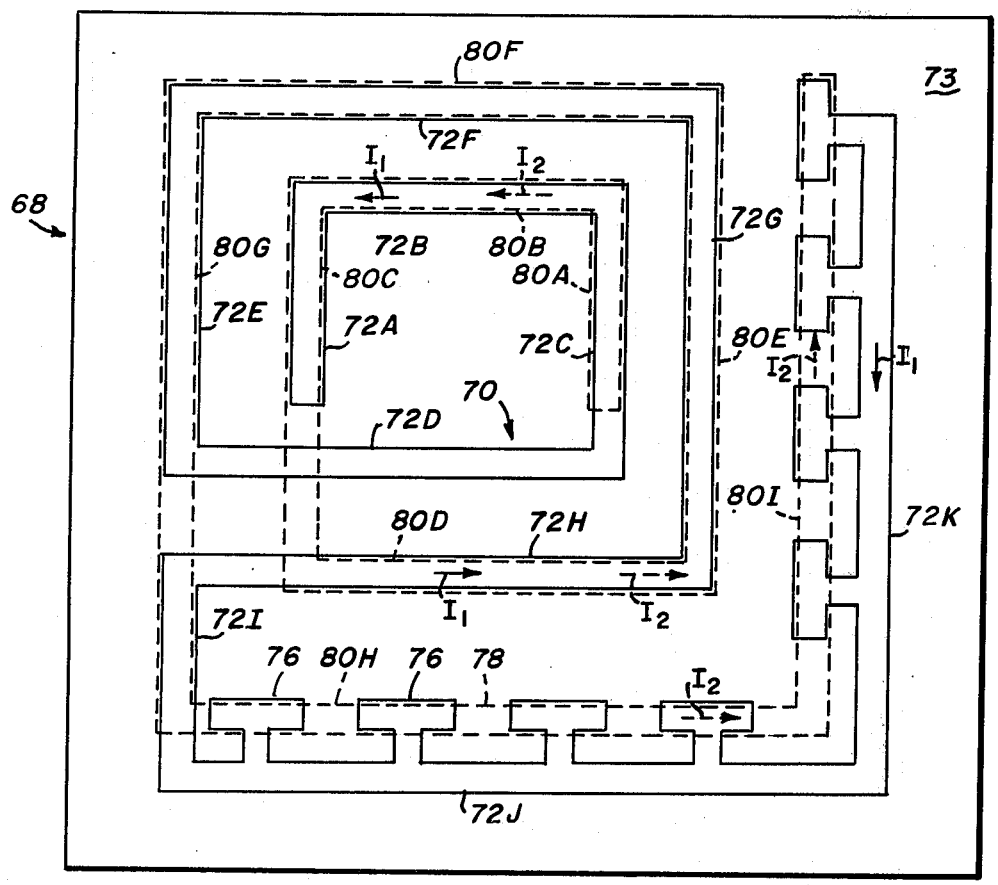
Fig_4

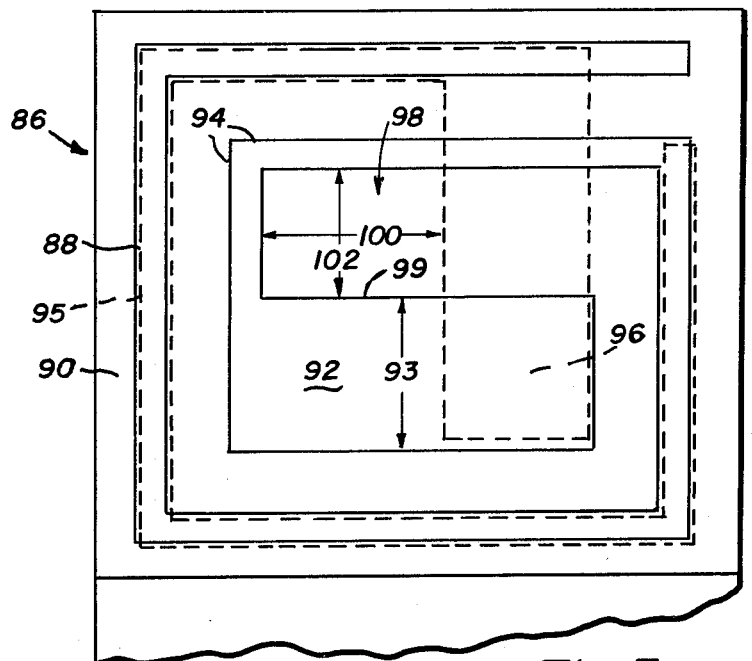
Fig_5
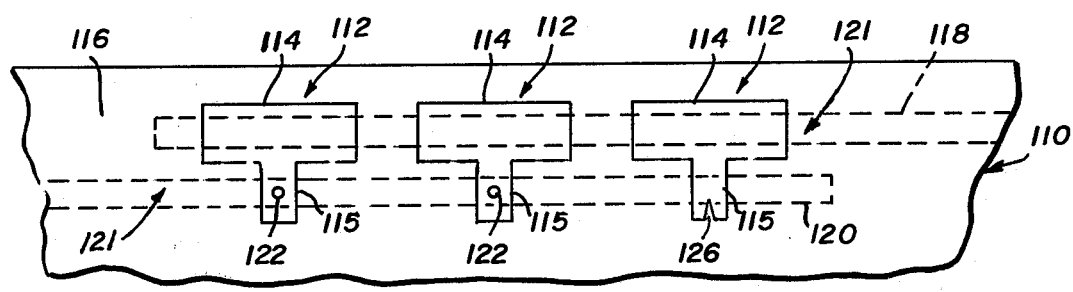
Fig_6
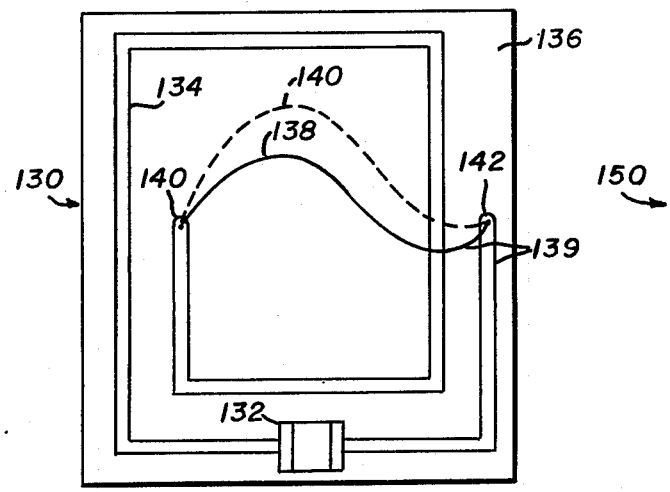
Fig_7
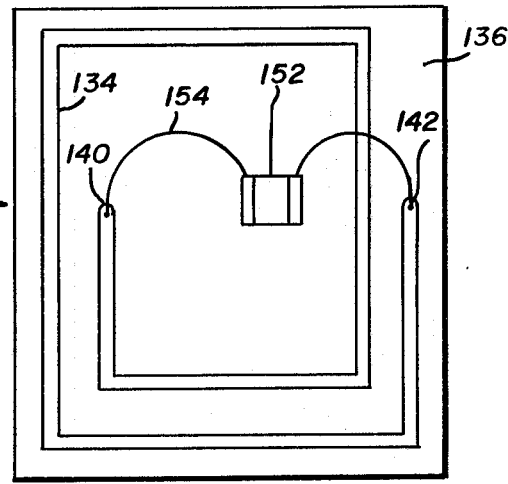
Fig_8

RECOGNITION AND IDENTIFICATION KEY HAVING ADAPTABLE RESONANT FREQUENCY AND METHODS OF ADAPTING SAME

BACKGROUND OF THE INVENTION

1. Field of the Invention

The present invention relates generally to a key or tag for use in an electronic recognition and identification system, and more particularly, to a recognition and identification key having a resonant frequency which is capable of being adapted to a new resonant frequency and a method of adapting same.

2. Description of the Prior Art

Recognition and identification objects in the form of keys, tags, cards or the like are presently used in electronic recognition and identification systems to operate electronic and electrically-controlled locks or to identify articles such as luggage, stored merchandise, vehicles, animals or the like to which they are attached.

Examples of prior electronic recognition and identification systems may be found in U.S. Pat. No. 3,970,824, entitled "Electronic Recognition and Identification System For Identifying A Family Of Codes"; U.S. Pat. No. 3,752,960, entitled "Electronic Identification And Recognition System"; U.S. Pat. No. 3,816,708, entitled "Improved Electronic Recognition And Identification System"; and U.S. Pat. No. 3,842,246, entitled "Recognition And Identification System With Noise Rejection Capabilities".

Heretofore, keys have been formed with inductive and capacitive reactances which are fixed such that the key is operative at a predetermined resonant frequency. As a consequence, the keys have been incapable of modification when operation at a different resonant frequency is desired.

In various applications, it is desirable to have a standard key which is capable of having its code selected to fit a desired lock, or which is capable of being modified corresponding to a change in the responsive identification code of a lock. Such a capability is not realized in mechanical lock and key systems and heretofore in unknown in electronic recognition and identification systems of this type.

Tags for objects have been made in the prior art, but once made there has been no method for readily modifying them to a new code.

Tags and keys manufactured by the prior art could not readily be modified near the conclusion of the manufacturing process to a new code, or adjusted or tuned to a desired final value.

SUMMARY OF THE PRESENT INVENTION

It is therefore an object of the present invention to provide a recognition and identification key which is capable of being adapted to operate at a selected resonant frequency.

Another object of the present invention is to provide a recognition and identification key having a characteristic resonant frequency which is capable of being simply, reliably and economically changed during or after its manufacture.

Still another object of the present invention is to provide a method for economically adapting the resonant frequency of a recognition and identification key or tag during or after its manufacture.

Briefly, the preferred embodiment comprises a substrate formed from a dielectric material and having opposed first and second surfaces, a first sheet of conductive material formed on the first surface in a looping pattern, and a second sheet of conductive material formed on the second surface in a looping pattern, the first and second sheets providing a characteristic inductance and capacitance which is resonant at a first frequency, at least one of the inductive and capacitive elements capable of being changed such that the key is resonant at a second frequency.

In a second embodiment, a method of changing the resonant frequency of a recognition and identification key comprises the steps of providing a dielectric substrate, providing a first conductive layer having a first inductance on one surface of the substrate, providing a second conductive layer on an opposed surface of the substrate, the second layer having a second inductance and forming a first capacitance with the first layer such that the first and second inductance and the first capacitance are resonant at a first frequency, at least one of the layers having a configuration which is capable of being changed, and changing the configuration of the layers such that the key is resonant at a predetermined second frequency.

In a third embodiment, a method of changing the resonant frequency of the key comprises the steps of including a length of wire between opposed ends of a conductive layer having a generally spiral shape so as to enclose a first area, and thereafter selectively moving the length of wire to enclose a second area such that the key is resonant at a second frequency.

An advantage of the present invention is that it provides a recognition and identification key having a frequency that is capable of being simply, reliably and economically changed.

Another advantage of the present invention is that it enables a rapid personalization of a universal recognition and identification key to a specific predetermined frequency during or subsequent to its manufacture.

Other objects and advantages of the present invention will become apparent to those skilled in the art after having read the following detailed description of the preferred embodiments which are illustrated in the several figures of the drawing.

IN THE DRAWING

FIG. 1 is a top plan view of a recognition and identification key in accordance with the present invention with the bottom conductive layer illustrated in dashed lines;

FIG. 2 is a cross-section view taken through the lines 2—2 of FIG. 1 with the horizontal dimensions illustrated on a contracted scale relative to the vertical dimensions, and additionally showing two protective layers on both the top and bottom;

FIG. 3 is a partial top plan view of a second embodiment of a key with the bottom conductive layer illustrated in dashed lines;

FIGS. 4–6 are partial top plan views of other alternative embodiments of a key with the respective bottom conductive layers illustrated in dashed lines; and FIGS. 7 and 8 are partial top plan views of embodiments of a key in accordance with the present invention, having only a single conducting surface.

DETAILED DESCRIPTION OF THE PREFERRED EMBODIMENTS

Referring now to FIGS. 1 and 2 of the drawing, a recognition and identification key or tag 10 in accordance with the present invention is illustrated in a top plan view and a cross-section view. As shown, the key 10 comprises a substrate 12 having opposed top and bottom surfaces 14 and 16, respectively, a layer 18 formed of a conductive material in a looping pattern on the surface 14 and a layer 20 formed on a conductive material in a looping pattern on the surface 16. The layer 20 is indicated by the dashed lines in FIG. 1. Protective dielectric layers 21 and 23 encapsulate the conductive layers 18 and 20.

The substrate 12 is formed of a dielectric material having a dielectric constant K with a flat shape in plan view, and with a thickness between the planar surfaces 14 and 16.

Layer 18 comprises an inner end 22, an outer end 24 and six elongated sides or sections 25A-F formed into a generally spiral shape extending in a clockwise direction from the inner end 22 to the outer end 24. The four inner sides 25A-D provide an inner loop, or turn, 26, and the four outer sides 25C-F provide an outer loop, or turn, 28, with the two middle sides 25C-D being common to the loops 26 and 28. The loops 26 and 28 have a characteristic inductance determined by their particular geometry. Depending inwardly from the two outermost sides 25E-F are six stubs 30A-F terminating in enlarged rectangular pads or plates 32A-F, respectively. Although only two turns and six stubs are illustrated it should be recognized that there can be any number of turns or stubs. Locations on the sides 25E-F intermediate to the plates 32A-F and prior to the plate 32F are designated by the reference numerals 33A-F, respectively, and serve as severing or cutting points for the selective removal of portions of the loop 28 as will be subsequently described in detail.

The layer 20 comprises an inner end 34, an outer end 36, and six elongated sides 37A-F formed into a generally spiral shape extending in a counterclockwise direction from the end 34 to the end 36. The sides 37A-D provide an inner loop, or turn, 38 and the sides 37C-F provide an outer loop 40 with the sides 37A-D of the inner loop 38 underlying those of the inner loop 26 and the sides 37E-F of the outer loop 40 underlying the plates 32. Because of this geometry the two sides 25E-F are disposed outwardly of those forming the outer loop 40 and adjacent to the respective edges of the substrate 12. The lateral dimension of the two sides 37E-F is substantially equal to the lateral dimension of the plates 32A-F. In the preferred embodiment, the edges of the sides 37 underlie the edges of the corresponding sides 25, although with reference to FIG. 1 the edges of the sides 37 are illustrated as being adjacent to the corresponding edges of the sides 25. The loops 38-40 also have a characteristic inductance. Furthermore, the plates 32A-F and underlying sides 37E-F of the outer loop 40 form six parallel plate capacitors electrically connected in parallel. Each parallel plate capacitor has a capacitance C that is proportional to the dielectric constant of the substrate K and the surface area A of the plate and that is inversely proportional to the thickness dimension of the substrate.

In the preferred embodiment the layers 18 and 20 are formed on the substrate by conventional etching techniques from a metal such as copper or aluminum and the substrate 12 is formed from a dielectric material such as polyethylene, polypropylene, polystyrene, polycarbonate, etc. In the embodiment, the layers 18 and 20 have a dimension along the side 25F of about 40 mils, and a thickness of about 2 mils, and the substrate 12 has a thickness of about 1 mil.

In operation, the layers 18 and 20 form a parallel circuit having a characteristic inductance and capacitance that is resonant at a predetermined frequency in a manner well known in the art. In accordance with the present invention, the resonant frequency is capable of being adapted or changed during, or after, manufacture of the key 10.

In order to change the resonant frequency, a selected one of the locations 33A-F is severed so as to disconnect a portion of the layer 18 and the corresponding plates, and hence, disconnect a portion of the capacitance from the circuit. For example, a cut at the location 33A removes the plate 32A from the circuit. This produces a corresponding decrease in the circuit capacitance and causes the resonant frequency of the card to increase. Similarly, a cut at the location 33B removes the plates 32A and 32B from the circuit.

It should be recognized that in this manner six capacitance reductions can be achieved. Furthermore, each cut also reduces the length of the outer loop 28, thus decreasing the inductance of the circuit. However, the change in inductance has been found to have a relatively small effect on the change in the resonant frequency relative to the effect caused by the removal of the plates. It should also be recognized that by forming the plates 32 with graduated dimensions, such as for example, providing plates having surface areas that vary in a percentage fashion, circuit capacitance can be reduced in 6 increments to result in equal percentage frequency increments.

Since the locations 33A-F lie along the two outermost sides 25E-F, and since the layer 20 is not beneath such sides, the tendency of the layer 18 to smear in a vertical direction and electrically contact the layer 20 after severing is precluded. It is noted that if smearing should occur, when metal layers 18 and 20 are above one another, a short circuit will result.

It has been found that the sections 33A to F can be severed with a scissors, a punch, a laser beam, or tearing the conductive layer by hand.

After or before the desired frequency is achieved, a protective layer 21 of a dielectric material, such as a film of polystyrene "Q dope" is applied to the exposed portions of the substrate and the conductive layers 18 and 20. In the preferred embodiment the layer is rolled into the structure, although it may also be applied by dipping techniques. The layer 21 primarily serves to protect the structure in such a manner as to prevent the resonant frequency from being inadvertently changed when it is subsequently encapsulated with a layer 23 of plastic material or layers of vinyl laminations.

In an alternative embodiment, a selected one of the stubs 30 is severed so as to remove a portion of the capacitance from the circuit. If, for example, the stub 30A is severed, the plate 32A is removed from the circuit, thereby producing a corresponding decrease in the circuit capacitance. As previously described, this causes the resonant frequency of the key to increase. Similarly, a greater resonant frequency results if the stubs 30A and 30B are severed. This removes the plates 32A and 32B from the circuit.

In still another alternative embodiment, one of the turns is severed at a location where the metal forming the turn is not above a bottom metal layer. Such a location typically occurs at a corner 29 or corner 40 (see FIG. 1). By severing the metal at corner 29, or corner 40, a turn or a large part of a turn can be removed. This enables a large change in resonant frequency to be achieved.

There are illustrated in FIGS. 3 to 8 other embodiments of recognition and identification keys made in accordance with the present invention.

Each of the keys in FIGS. 3 to 6 includes a dielectric substrate which serves as a support for the resonant circuit comprising an inductive and a capacitive element. In a manner similar to that previously described, protective layers cover the circuit and the substrate. Although not shown in FIGS. 3–6, it should be understood that protective layers of the type described are included in the key structures.

In typical practice, the first protective layer 21 is applied after the metal surfaces 18 and 20 have been shaped or etched, so the gaps between the metal are partially filled. The unfilled part is simply trapped air and is indicated by the numerals 27 in FIG. 2. Next, the cutting and frequency changing procedures described for FIG. 1 and FIGS. 3 to 6 are applied. After the frequency is established, the final protective layer 23 is applied. A primary purpose of layer 21 is to prevent layer 23 from changing the frequency.

Referring now to FIG. 3, another embodiment of the present invention is illustrated in a partial plan view. As shown, a portion of a top layer 50 formed from a conductive material and comprising the sides 52 and 54 of an outer inductive loop is disposed on a dielectric substrate 56. Conductive stubs 58 connect the rectangular conductive plates 60 to the sides 52 and 54. Each of the stubs 58 is generally J-shaped and includes a bight portion 62 adjacent to the corresponding edge 64 of the substrate 56. A conductive layer 66, illustrated in dashed lines, is disposed on the opposed surface of the substrate subjacent the plates 60.

In a manner similar to that previously described, in order to change the resonant frequency, a selected one or more of the bight portions 62 of the stubs 58 is severed to remove the corresponding plate and hence decrease the capacitance of the circuit. This increases the resonant frequency of the circuit. Since the bight portion 62 is adjacent the edge 64 of the substrate and laterally removed from the subjacent layer 66, smearing of the metal layers is avoided. The purpose of adding the bight portion 62 is to allow deletion of the individual capacitance plates 60 in an individual manner by cutting the outside edge only. A similar function achieved in FIG. 1 necessitated cutting at stubs 30A–F.

Yet another alternative embodiment is illustrated in a partial plan view in FIG. 4. In the embodiment the key 68 includes a top conductive layer 70 having eleven sides 72A–K arranged into a two-loop pattern on the substrate 73 with stubs 74 interconnecting the sides 72J–K to the plates 76. As shown, the side 72I extends in a direction opposed to the central loops so that the outer loop formed by the sides 72J–K is adjacent to the loops formed by the sides 72G–H. A bottom conductive layer 78, shown in dashed lines, is formed into a spiral pattern on the opposed surface of the substrate 73. The layer 78 includes nine sides 80A–I with its two outer sides 80H–I underlying the plates 76 and with its side 80G underlying the sides 72E and 72I of the layer 70. Current flow through the conductive layer 70 is designated as I1 and current flow through the conductive layer 78 is designated as I2.

In operation, when the key 68 is brought near the sensing zone of an electronic recognition and identification system (not shown), the pattern of the conductive layers 70 and 78 is such that at any instant of time the current flow through the central loops of the conductor 70 is in the same direction as the current flow through the sides 80A–F of the conductor 78. These parallel, and hence additive, currents serve to increase the electromagnetic coupling between the key and the sensor (not shown) of the associated system. In FIG. 4, because of the unique geometry of the layers, the current I1 flowing through the sides 72H–K in the outer turn is opposite in circular direction to the current I2 flowing through the sides 80G–I. These antiparallel currents through the respective outer turns produce canceling magnetic fields which have practically no effect on the total amplitude of the radiation pattern of the key.

As previously described, the resonant frequency of the key is changed by a desired amount by selectively severing a selected location on the sides 72J or 72K. Because of the field canceling effect of the outer strip such severing does not appreciably change the generally constant electromagnetic coupling of the key, and hence, has very little effect on the amplitude of the sensed signals. Consequently, when several keys, or one key having several resonant circuits, are presented for recognition and identification by the system at any one time, each tends to couple equal magnitude signals to the system. Equal magnitude precludes problems associated with the automatic gain control circuit in the system.

Referring now to FIG. 5, still another embodiment of the present invention is illustrated. As shown, the key 86 includes a top conductive layer 88 formed in a spiral pattern on the substrate 90. The layer 88 includes an inner end 92 that has a lateral dimension 93 that is much greater than that of the remaining sides 94. A bottom conductive layer 95, shown in dashed lines, is similarly formed in a spiral pattern on the opposed surface of the substrate and generally underlies the layer 88 and with its inner end 96 underlying a portion of the end 92. The inner edges of the sides 92, 94 and 96 form a rectangular flux window 98 in plan view which has an inner length 100 and an inner width 102. The window 98 defines a path for magnetic flux with the conductive sides framing the window serving to block other flux through the window.

In order to decrease the resonant frequency of the key 86 after manufacture, a portion of the ends 92 or 96 adjacent to the inner edges of the flux window 98 are selectively removed, such as by cutting. This causes the dimensions 100 and 102 of the window 98 to increase which increases the effective inductance of the circuit. Alternatively, by moving the edge 99 down or by moving the edge 101 to the right, the area of the flux window 98 increases. This allows more flux to flow and decreases the resonant frequency.

FIG. 6 illustrates in a partial plan view still another embodiment of a key or tag made in accordance with the present invention. The fundamental difference between the key 110 and the keys described above is in the construction of the capacitors 112. As shown, conductive plates 114 having downwardly protruding legs 115 are formed on a top surface of a dielectric substrate 116. Elongated portions 118 and 120 of an inductance 121 (shown in dashed lines) are formed on the bottom surface of the dielectric 116 with the portion 118 being subjacent to the plates 114 and the portion 120 being subjacent to the legs 115. Accordingly, each of the plates 114 and a portion of 118 form a parallel plate capacitor 112.

In order to adapt or adjust the resonant frequency of the circuit on the key, selected plates 114 are attached to the portion 120 by welds 122. The welds 122 are preferably of the spot type. Alternatively, the welds can be of the cold type as at 126 in which the lower surface of the aluminum leg is nicked and smeared through the substrate into electrical contact with the portion 120. Alternatively, a hole may be made at 122, and solder applied to 115 and the subjacent portion of 120, to form a through connection at 122. The attachment of each plate 114 serves to increase the capacitance of the circuit which causes the resonant frequency of the card to decrease.

There is illustrated in FIGS. 7-8 still another alternative embodiments of recognition and identification keys in accordance with the present invention.

The fundamental difference between the key 130 of FIG. 7 and those described above is the addition of a capacitor 132, usually of the chip type, connected to adjacent portions of a conductor 134 formed on a surface of the substrate 136, and the addition of a movable flexible conductor 138 between the ends 140 and 142 of the conductor 134. The conductor 138 may have a generally S-shape and together with conductor 134 forms a closed loop or an inductor 139. The area of the central turns of inductor 139 is capable of being varied by moving the conductor 138. Key 130 also differs from the keys described before in that there is metal 18 on surface 14 of 12 only, and not on surface 16.

In operation, when it is desired to decrease the resonant frequency of the card, the conductor 138 is moved upwards to a position indicated by the dashed lines 140 which increases the flux linkage area of the turn. This causes the effective inductance to increase and hence the resonant frequency to decrease. Similarly, when it is desired to cause the resonant frequency to increase the conductor is moved downwards to a position wherein the flux linkage area is decreased.

In FIG. 8, the key 150 is similar to that illustrated in FIG. 7 except that the capacitor 152 is connected directly to intermediate portions of the movable flexible conductor 154. In the preferred embodiment, the capacitor is of the chip type. The operation of adapting the resonant frequency of the key involves moving both the capacitor and the conductor 154 to change the total area of the central turns and hence frequency.

The terms "up" and "down" and words of similar import as used herein are intended to apply only to the position of the parts as illustrated in the drawing, since it is well known that recognition and identification keys of the general type illustrated may be oriented in many different positions during fabrication and use. Furthermore, it should be recognized that many resonant circuits can be formed on each substrate.

From the above, it can be seen that a recognition and identification key and a method of adapting its resonant frequency has been described which fulfills all of the objects and advantages set forth above.

While there has been described what are at present considered to be the preferred embodiments of the invention, it will be understood that various modifications may be made therein and it is intended to cover in the appended claims all such modifications as fall within the true spirit and scope of the invention.

What is claimed is:

1. A method of changing the resonant frequency of a recognition and identification key comprising:
   providing a dielectric substrate;
   providing a first conductive layer having a first inductance on one surface of the substrate;
   providing a second conductive layer on an opposed surface of the substrate, the second layer having a second inductance and forming a first capacitance with the first layer such that the first and second inductance and the first capacitance are resonant at a first frequency, at least one of the layers having a configuration which is capable of being changed; and
   changing the configuration of the layers such that the key is resonant at a predetermined second frequency.

2. A method of changing the resonant frequency of a recognition and identification key as recited in claim 1 and further comprising forming a first dielectric layer over said first and second conductive layers and the exposed portions of said surface of said substrate that serves to protect the layers, and thereafter forming a second dielectric layer over said first dielectric layer that serves to encapsulate the key.

3. A method of changing the resonant frequency of a recognition and identification key comprising:
   providing a dielectric substrate;
   providing a first conductive layer having a first side, a plurality of plates and a like plurality of stubs each connecting one of said plates to said first side, said first layer forming a first inductance on one surface of the substrate;
   providing a second conductive layer having a second side on an opposed surface of the substrate with such second side being subjacent to said plates and forming a first capacitance, the second layer having a second inductance such that the first and second inductances and the first capacitance are resonant at a first frequency; and
   severing said first side at a selected location so as to electrically remove corresponding ones of said plates from said capacitive element and cause said key to resonate at a predetermined second frequency.

4. A method of changing the resonant frequency of a recognition and identification key comprising:
   providing a dielectric substrate;
   providing a first conductive layer having an outer side, a plurality of plates and a like plurality of stubs each connecting one of said plates to said outer side, said first layer forming a first inductance on one surface of the substrate;
   providing a second conductive layer having an outer side of an opposed surface of the substrate with such outer side being subjacent to said plates and forming a first capacitance, the second layer having a second inductance such that the first and second inductances and the first capacitance are resonant at a first frequency; and
   severing said outer side of said first layer at a selected location so as to electrically remove corresponding ones of said plates from said capacitive element and cause said key to resonate at a predetermined second frequency.

5. A method of changing the resonant frequency of a recognition and identification key comprising:
   providing a dielectric substrate;

providing a first conductive layer having an outer side, a plurality of plates and a like plurality of stubs each connecting one of said plates to said outer side, said first layer forming a first inductance on one surface of the substrate;

providing a second conductive layer having an outer side on an opposed surface of the substrate with such outer side being subjacent to said plates and forming a first capacitance, the second layer having a second inductance such that the first and second inductances and the first capacitance are resonant at a first frequency; and selectively severing said stubs so as to electrically remove corresponding ones of said plates from said capacitive element and cause said key to resonate at a predetermined second frequency.

6. A method of changing the resonant frequency of a recognition and identification key comprising:
providing a dielectric substrate;
providing a first spiral conductive layer having interconnected first, second and third inner sides formed into a generally U-shaped configuration and having a first inductance on one surface of the substrate;
providing a second spiral conductive layer having a fourth inner side of an opposed surface of the substrate with said fourth said subjacent to said first side such that said first, second, third and fourth sides have a closed-loop configuration in plan view, the second layer having a second inductance and forming a first capacitance with the first layer such that the first and second inductance and the first capacitance are resonant at a first frequency; and
selectively removing portions of said sides in such a manner as to cause said key to resonate at a predetermined second frequency.

7. A method of changing the resonant frequency of a recognition and identification key as recited in claim 6 wherein said step of selectively removing includes trimming said sides.

8. A recognition and identification key for use in an electronic identification system comprising:
a substrate formed of an electrically insulating material and having a generally planar first surface;
a first sheet of conductive material formed on said first surface in a looping pattern so as to provide an inductive element;
said first sheet including an inner end, an outer end and comprising a length of flexible conductive material connected to said inner and said outer ends with said first sheet forming an enclosed loop having a first area corresponding to a first inductance, said length being movable such that the area and hence said first inductance is capable of being changed to cause a corresponding change in resonant frequency; and
a capacitive element having a capacitance reactance and being coupled to said first sheet such that said elements are resonant at a first sheet such that said elements are resonant at a first frequency, at least one of said inductive and capacitive elements capable of being changed such that the key is resonant at a second frequency.

9. A recognition and identification key as recited in claim 8 wherein said capacitive element is connected in an electrical series configuration to said first sheet.

10. A recognition and identification key as recited in claim 8 wherein said first length includes first and second segments and said capacitive element is connected in an electrical series configuration to said first and second segments.

11. A recognition and identification key for use in an electronic identification system comprising:
a substrate formed of an electrically insulated material and having a generally planar first surface;
a first sheet of conductive material formed on said first surface in a looping pattern so as to provide an inductive element;
a capacitance element having a capacitive reactance and being coupled to said first sheet such that said elements are resonant at a first frequency, at least one of said inductive and capacitive elements capable of being changed such that the key is resonant at a second frequency; and
further including a first layer comprised of a second dielectric material disposed in a coating relationship over said first sheet and the exposed portions of said substrate, said first layer serving to protect said elements, and a second layer formed of a third dielectric material overlaying said first layer and serving to encapsulate the key.

12. A method of changing the resonant frequency of a recognition and identification key comprising:
providing a dielectric substrate;
providing a first conductive layer forming a first inductive element on one surface of the substrate, said first layer having a generally spiral shape;
providing a length of wire between opposed ends of said first layer so as to enclose a first area; and
providing a capacitive element that is electrically coupled to said first layer such that the elements are resonant at a first frequency, at least one of the elements having a configuration which is capable of being changed; and
changing the configuration of the elements by selectively moving the length of said wire to enclose a second area such that the key is resonant at a predetermined second frequency.

13. A method of changing the resonant frequency of a recognition and identification key comprising:
providing a dielectric substrate;
providing a first conductive layer forming a first inductive element on one surface of the substrate;
providing a capacitive element that is electrically coupled to said first layer such that the elements are resonant at a first frequency, at least one of the elements having a configuration which is capable of being changed, said capacitive element including first and second leads each comprising a length of wire connected to opposed ends of said first layer so as to enclose a first area; and
changing the configuration of the elements by moving the lengths of said wire to enclose a second area such that the key is resonant at a predetermined second frequency.

14. A method of changing the resonant frequency of a recognition and identification key comprising:
providing a dielectric substrate;
providing a first conductive layer forming a first inductive element on one surface of the substrate;
providing a capacitive element that is electrically coupled to said first layer such that the elements are resonant at a first frequency, at least one of the elements having a configuration which is capable of being changed;

changing the configuration of the elements such that the key is resonant at a predetermined second frequency;

forming a second layer of a dielectric material over said elements and the exposed portions of said substrate; and forming a third layer of a dielectric material over said second layer so as to encapsulate said key.

15. A recognition and identification key for use in an electronic identification system comprising:

a substrate formed from a dielectric material and having opposed first and second surfaces;

a first elongated sheet of conductive material formed on said first surface in a looping pattern; and a second elongated sheet of conductive material formed on said second surface in a looping pattern, said first and second sheets forming an inductive element having a characteristic inductance and simultaneously forming a capacitive element having a characteristic capacitance, said elements being resonant at a first frequency, at least one of said inductive and capacitive elements capable of being changed such that the card is resonant at a second frequency or a multiplicity of other frequencies.

16. A recognition and identification key as recited in claim 15 wherein said first sheet includes at least one outer side, a plurality of plates and a like plurality of stubs each connecting one of said plates to said at least one outer side and wherein said second sheet includes an outer side disposed subjacent to said plates, said at least one outer side capable of being severed at a selected location so as to electrically remove corresponding ones of said plates from said capacitive element.

17. A recognition and identification key as recited in claim 15 and further comprising a plurality of conductive plates each having a protruding portion, and means for electrically connecting through said substrate selected protruding portions of said plates to said second sheet.

18. A recognition and identification key as recited in claim 15 wherein said first sheet includes interconnected first, second and third inner sides having a generally U-shaped configuration and said second sheet includes a fourth inner side disposed subjacent said first side, said first, second, third and fourth sides having a closed loop configuration in plan view and forming a central window, and means for selectively removing portions of said sides in such a manner as to cause said key to resonate at said second frequency.

19. A recognition and identification key as recited in claim 15 wherein said first sheet includes a first plurality of sides arranged in a generally spiral configuration to form a first inner loop and a first outer loop, a plurality of plates and a like plurality of stubs each connecting one of said plates to a location on a side forming said first outer loop, said sides forming said first outer loop capable of being severed at a selected location so as to electrically remove corresponding ones of said plates from said capacitive element, and said second sheet includes a second plurality of sides arranged in a generally spiral configuration to form a second inner loop generally subjacent to said first inner loop and a second outer loop generally subjacent to said plurality of plates, whereby when current flows through said first and second sheets the currents flowing through said first and second inner loops produce additive magnetic fields and the currents flowing through said first and second outer loops produce opposed magnetic fields such that the radiation pattern of the key is generally constant when said side forming said first outer loop is severed.

20. A recognition and identification key as recited in claim 15 wherein said first sheet includes at least one outer side, a plurality of plates and a like plurality of stubs each connecting one of said plates to said at least one outer side and wherein said second sheet includes an outer side disposed subjacent to said plates, each said stub capable of being severed so as to electrically remove a corresponding plate from said capacitive element.

21. A recognition and identification key as recited in claim 20 wherein each said stub has a generally J-shape in plan view and includes a bight portion disposed adjacent the edge of said substrate.

22. A recognition and identification key as recited in claim 15 and further including a first layer comprised of a second dielectric material disposed in a coating relationship over said first and second sheets and the exposed portions of said first and second surfaces, said first layer serving to protect said elements, and a second layer formed of a third dielectric material overlaying said first layer and serving to encapsulate the key.

* * * * *